(12) United States Patent
Kisra et al.

(10) Patent No.: US 10,577,908 B2
(45) Date of Patent: Mar. 3, 2020

(54) WORKFLOW FOR DETERMINING STRESSES AND/OR MECHANICAL PROPERTIES IN ANISOTROPIC FORMATIONS

(71) Applicant: Schlumberger Technology Corporation, Sugar Land, TX (US)

(72) Inventors: Saad Kisra, Abingdon (GB); John Adam Donald, Clamart (FR); Vincenzo De Gennaro, Pau (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 818 days.

(21) Appl. No.: 15/038,689

(22) PCT Filed: Nov. 21, 2014

(86) PCT No.: PCT/US2014/066855
§ 371 (c)(1),
(2) Date: May 23, 2016

(87) PCT Pub. No.: WO2015/077581
PCT Pub. Date: May 28, 2015

(65) Prior Publication Data
US 2016/0290113 A1    Oct. 6, 2016

Related U.S. Application Data

(60) Provisional application No. 61/907,879, filed on Nov. 22, 2013.

(51) Int. Cl.
*G06F 17/50*   (2006.01)
*E21B 43/26*   (2006.01)
(Continued)

(52) U.S. Cl.
CPC .............. *E21B 43/26* (2013.01); *E21B 47/00* (2013.01); *E21B 47/024* (2013.01); *E21B 49/00* (2013.01);
(Continued)

(58) Field of Classification Search
CPC ....................................................... G06F 17/50
(Continued)

(56) References Cited

U.S. PATENT DOCUMENTS 7,652,950 B2 *   1/2010   Sinha ........................ G01V 1/50
                                                    181/105
7,953,587 B2 *   5/2011   Bratton .................... E21B 43/00
                                                    703/10

(Continued)

FOREIGN PATENT DOCUMENTS

| CA | 2786372 A1 | 7/2011 |
| WO | 2013/112466 A1 | 8/2013 |
| WO | 2013/148623 A1 | 10/2013 |

OTHER PUBLICATIONS

International Search Report and Written Opinion for the equivalent International patent application PCT/JS2014/066855 (1S13.4427-WO-PCT) mailed on Mar. 27, 2015.
(Continued)

*Primary Examiner* — Thai Q Phan

(57) ABSTRACT

A method, apparatus, and program product estimate anisotropic properties of an anisotropic formation based at least in part on determinations of a deviation of a wellbore associated with the anisotropic formation and an availability of non-sonic measurement data associated with the anisotropic formation. The determinations are used in the selection of at least one computer-implemented model that in turn may be applied to determine one or more unknown elastic constants for an elastic stiffness matrix.

20 Claims, 8 Drawing Sheets

(51) Int. Cl.
*E21B 47/00* (2012.01)
*G01V 1/50* (2006.01)
*E21B 47/024* (2006.01)
*E21B 49/00* (2006.01)
*E21B 7/04* (2006.01)
*E21B 47/12* (2012.01)

(52) U.S. Cl.
CPC .................. *G01V 1/50* (2013.01); *E21B 7/04* (2013.01); *E21B 47/12* (2013.01); *G01V 2210/1299* (2013.01); *G01V 2210/1429* (2013.01); *G01V 2210/6169* (2013.01); *G01V 2210/626* (2013.01); *G01V 2210/6242* (2013.01)

(58) Field of Classification Search
USPC ............. 703/2, 10; 367/31, 73; 175/2; 702/6
See application file for complete search history.

(56) References Cited

U.S. PATENT DOCUMENTS

| | | | | |
|---|---|---|---|---|
| 8,117,014 | B2* | 2/2012 | Prioul | G01V 1/48 367/31 |
| 8,175,807 | B2 | 5/2012 | Suarez-Rivera et al. | |
| 8,296,114 | B2* | 10/2012 | Prasad | E21B 10/00 703/10 |
| 8,638,639 | B2* | 1/2014 | Bratton | G01V 1/50 367/35 |
| 9,376,902 | B2* | 6/2016 | Prioul | E21B 43/119 |
| 9,835,746 | B2* | 12/2017 | Yan | G01V 1/282 |
| 2005/0065730 | A1 | 3/2005 | Sinha | |
| 2007/0183259 | A1 | 8/2007 | Yogeswaren et al. | |
| 2007/0294034 | A1* | 12/2007 | Bratton | E21B 41/00 702/6 |
| 2008/0165619 | A1 | 7/2008 | Bachrach et al. | |
| 2009/0225627 | A1 | 9/2009 | Sinha et al. | |
| 2010/0250214 | A1* | 9/2010 | Prioul | G01V 1/48 703/10 |
| 2011/0170372 | A1 | 7/2011 | Horne et al. | |
| 2013/0206475 | A1* | 8/2013 | Prioul | E21B 43/119 175/2 |
| 2014/0293745 | A1* | 10/2014 | Downton | G01V 1/282 367/73 |
| 2015/0055438 | A1* | 2/2015 | Yan | G01V 1/282 367/73 |

OTHER PUBLICATIONS

International Preliminary Report on Patentability for the equivalent International patent application PCT/US2014/066855 (IS13.4427-WO-PCT) mailed on Jun. 2, 2016.
Search Report for the equivalent European patent application 14863669.9 (IS14.4427-EP-EPT) mailed on Jun. 6, 2017.
Communication pursuant to Article 94(3) for the equivalent European patent application 14863669.9 (IS14.4427-EP-EPT) mailed on Jun. 22, 2017.
Communication pursuant to Article 94(3) for the equivalent European patent application 14863669.9 (IS14.4427-EP-EPT) mailed on Jul. 11, 2019.

* cited by examiner

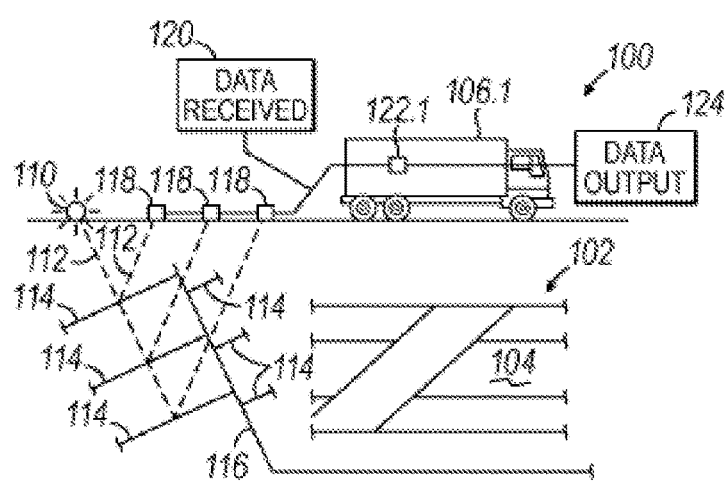
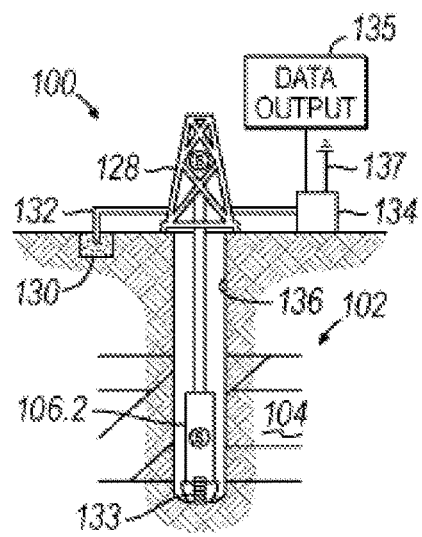
FIG. 2A
FIG. 2B
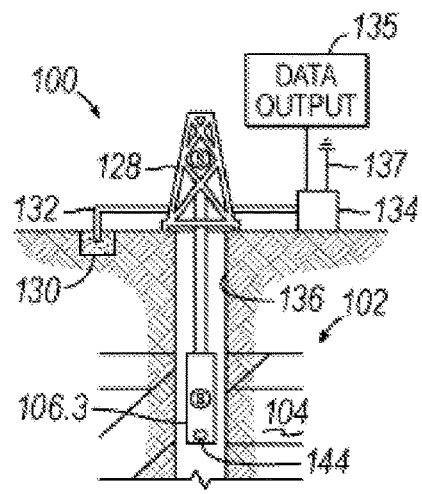
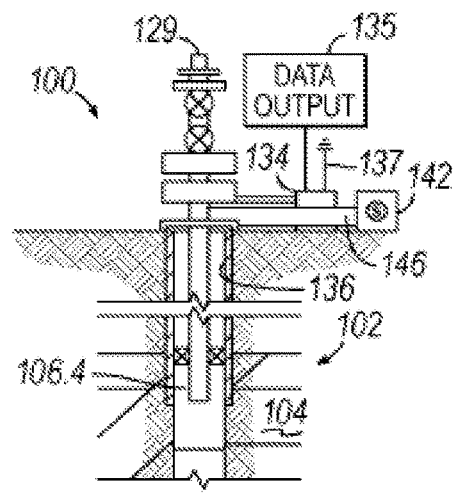
FIG. 2C
FIG. 2D

TI Elastic Moduli Computation (Optional)

This module calculates stiffnesses from the compressional, shear and Stonely slownesses assuming a TIV medium. The calculations are done for either a vertical well or a horizontal section.

You can uncheck and skip this step if the moduli are already calculated elsewhere.

Also, isotropic YME and PR are calculated with compressional and fast shear slownesses.

| Stiffness | Vertical Well | Horizontal Well |
|---|---|---|
| C11 | Modeled | $=\rho V_p^2$ |
| C13 | Modeled | Modeled |
| C33 | $=\rho V_p^2$ | Modeled |
| C44 | $=\rho V_{slow\_s}^2 = \rho V_{fast\_s}^2$ | $=\rho V_{slow\_s}^2$ |
| C66 | $=\rho V_{shear\_stonely}^2$ | $=\rho V_{fast\_s}^2$ |

Top (ft): 5499.500    Bottom (ft): 11724.001

[X] TI elastic moduli (?)

Well deviation: Vertical ▼

Back    Next    Cancel

FIG. 7

Anisotropic (Dynamic) Mechanical Properties

Young's modulus and Poisson ratio are calculated assuming a VTI model, using one of the following models:

Top (ft): 5499.500    Bottom (ft): 11724.001

☐ AnisoMecPro ANNIE (?)

$$C_{12} = C_{13}$$

$$C_{13} = C_{33} - 2C_{44}$$

☒ AnisoMecPro MANNIE CORE (?)

Additional parameters (based on core analysis data) are added to ANNIE model.

$$C_{12} = mult_{13} C_{13}$$

$$C_{13} = mult_{33} C_{33} - 2C_{44}$$

mult13: 1.26    mult33: 1.02

☐ AnisoMecPro MANNIE SONIC (?)

MANNIE sonic based model allows accessing the two multiplier mult13 and mult33 as a function of Thomsen parameter Gamma.

$$mult_{13} = a_{13}(1 - s_{13} 2\gamma C_{55}) + b_{13}$$

$$mult_{33} = a_{33}(1 - s_{33} 2\gamma C_{55}) + b_{33}$$

Where a13 and a33 are the GAIN coefficients, s13 and s33 are the SLOPE coefficients and b13 and b33 are the OFFSET coefficients.

A13: 1    A33: 1

B13: 0    B33: 0

S13: 0.0194    S33: 0.029

[ Back ]  [ Next ]  [ Cancel ]

FIG. 8

WORKFLOW FOR DETERMINING STRESSES AND/OR MECHANICAL PROPERTIES IN ANISOTROPIC FORMATIONS

CROSS-REFERENCE TO RELATED APPLICATION

This application claims the benefit of U.S. Provisional Application No. 61/907,879 filed on Nov. 22, 2013 by Kisra et al., the entire disclosure of which is incorporated by reference herein in its entirety.

BACKGROUND

Ascertaining hydraulic fracture effectiveness in the oil & gas industry depends in part on the evaluation of completion quality (e.g., rock susceptibility to fracturing, fracture vertical containment, fracture conductivity, interference of complex natural fracture network, rock-fluid interaction, etc.). Many of the factors indicative of completion quality are influenced to various extents by the mechanical behavior of the source rock in a subsurface formation. The mechanical behavior of geologic materials such as soils and rocks is generally dependent on the applied state of stress and the structure, with the latter generally resulting from the combined effect of fabric (i.e., spatial arrangements of solid particles) and bonding (i.e., links between solid particles).

Geologic materials exhibiting different properties along different locations within their body are generally referred to as heterogeneous. Their heterogeneity may be random or organized. Layered media are examples of materials with organized heterogeneity that exhibit similar properties within a bed plane and different properties perpendicular to the bed plane. These types of materials may be modeled by assuming rotational symmetry in material properties, with an axis of rotation perpendicular to bedding. Because of the laminated structure (which may be fine-scale, as in shales, or large-scale, as in reservoir interbeds) their stress-strain relationships change with orientation to bedding. In general, laminated materials tend to be stiffer along the direction parallel to bedding and more compliant along the direction perpendicular to bedding. Correspondingly, propagating sound waves (compressional and shear) in these materials result in wave velocities that are higher parallel to bedding and lower perpendicular to bedding. The theory of elastic anisotropy describes this behavior. By defining material properties along principal directions of material symmetry, it provides a methodology for predicting material behavior under any conditions of applied loading and deformation.

Geologic materials are complex and often exhibit various types of heterogeneity (e.g., fine-scale texture superposed to the presence of fracture sets and as part of a larger scale structure). Furthermore, the layering may not be ideal (e.g., some beds may have different orientations or be discontinuous). The resulting stress-strain behavior may or may not be well represented by the elastic anisotropic theory, and may change with scale (from sample-scale to log-scale). Furthermore, their stress-strain behavior may not be elastic (e.g., plastic shales).

There are three basic types of formations: formations that have identical elastic properties in all three spatial directions are called isotropic, formations that have identical elastic properties in two directions but a different property in the third direction are called transverse isotropic (TI), and formations that have different properties in all three dimensions are called orthotropic. There are two independent elastic constants, or moduli, that characterize isotropic formations, five independent elastic constants that characterize TI formations and nine independent elastic constants that characterize orthorhombic formations. The aforementioned types of isotropic formations may be modeled using isotropic earth models. For example, to model a TI formation, the five elastic constants associated with TI formations may be determined by a combination of measurements and assumptions, e.g., using data collected by a sonic tool, referred to herein as sonic measurement data, to provide three of the five elastic constants associated with TI formations, with the remaining elastic constants determined via modeling.

Anisotropic formations such as TI formations present challenges in the determination of the stresses and mechanical properties (e.g., properties such as vertical Young's Modulus, horizontal Young's Modulus, vertical plane shear modulus, horizontal plane shear modulus, vertical Poisson Ratio, etc.) that define the mechanical behavior of a subsurface formation. A multitude of approaches and simulation models have been developed, each having different advantages and disadvantages in different scenarios, as well as requiring different measurement data as input. As a result, it has been found that determining stresses and/or mechanical properties for use in evaluating completion quality or in other applications in such environments can be challenging, particularly in the presence of incomplete measurement data and the availability of multiple simulation models and/or approaches.

SUMMARY

Properties of an anisotropic formation may be estimated by determining a deviation of a wellbore associated with the anisotropic formation, determining input sources for a first subset of a plurality of elastic constants for a stiffness matrix based upon the determined deviation of the wellbore, where each of the determined input sources provides sonic measurement data for use in determining at least one elastic constant among the plurality of elastic constants, determining an availability of non-sonic measurement data associated with the anisotropic formation, selecting at least one computer-implemented model among a plurality of computer-implemented models based at least in part upon the determined availability of non-sonic measurement data, applying the selected at least one computer-implemented model to determine a second subset of the plurality of elastic constants for the stiffness matrix, and estimating an anisotropic stress or an anisotropic mechanical property for the anisotropic formation using the determined plurality of elastic constants for the stiffness matrix.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

BRIEF DESCRIPTION OF THE DRAWINGS

FIGS. 2A-2D illustrate simplified, schematic views of an oilfield having subterranean formations containing reservoirs therein in accordance with implementations of various technologies and techniques described herein.

FIGS. 7-8 are representative display presentations capable of being generated in the anisotropic property workflow of FIG. 6.

DETAILED DESCRIPTION

Figure 1:
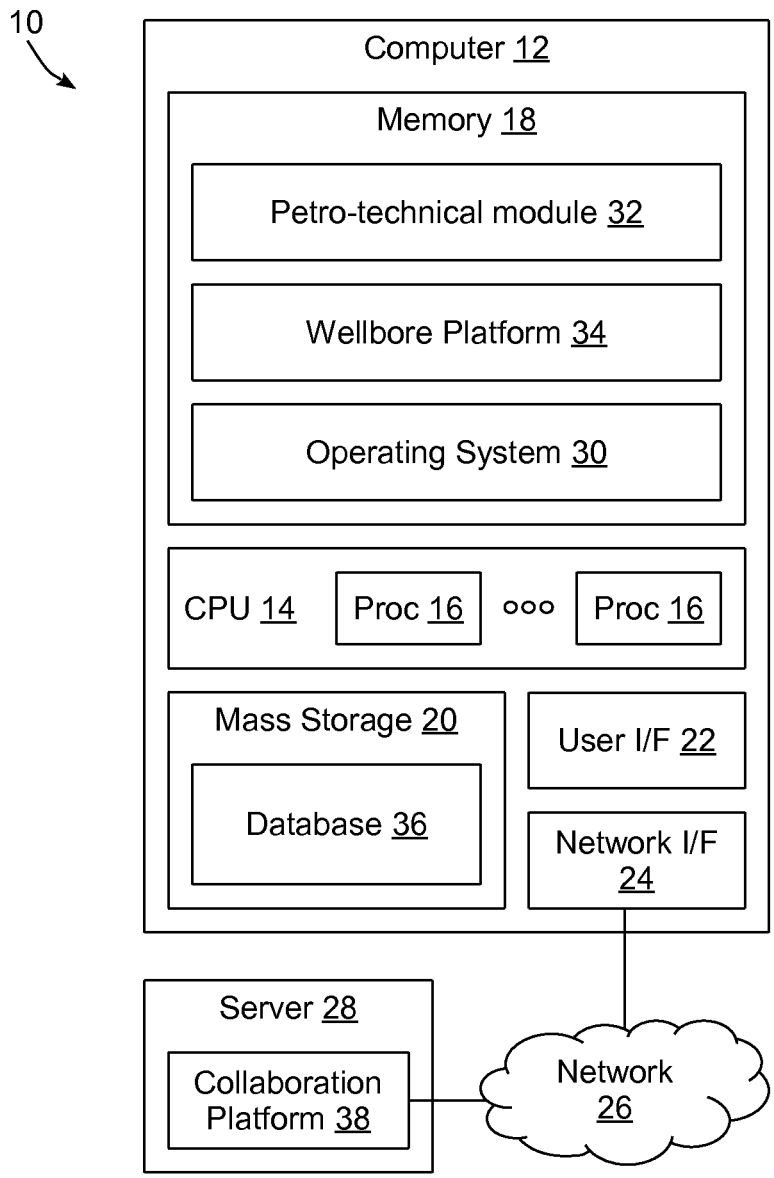
FIG. 1 is a block diagram of an example hardware and software environment for a data processing system in accordance with implementation of various technologies and techniques described herein.

The herein-described embodiments provide a method, apparatus, and program product that estimate anisotropic properties of an anisotropic formation based at least in part on determinations of a deviation of a wellbore associated with the anisotropic formation and an availability of non-sonic measurement data associated with the anisotropic formation. The determinations are used in the selection of at least one computer-implemented model that in turn may be applied to determine one or more unknown elastic constants for an elastic stiffness matrix.

Furthermore, it will be appreciated that the herein-described embodiments are directed to a technical solution that applies at least in the technical field of estimating geomechanical properties and that in the least transform measurement data from a wellbore into anisotropic stresses and/or anisotropic mechanical properties that in turn may themselves be transformed and used for various oil & gas operations such as wellbore placement and/or trajectory, wellbore stability testing, wellbore drilling, hydraulic fracture simulation, determining hydraulic fracturing perforation, stage and/or completion placement, hydraulic fracturing operations, evaluating hydraulic fracture effectiveness and/or completion quality (e.g., rock susceptibility to fracturing, fracture vertical containment, fracture conductivity, interference of complex natural fracture network, rock-fluid interaction, etc.), etc.

In some embodiments, for example, properties of an anisotropic formation may be estimated by determining a deviation of a wellbore associated with the anisotropic formation, determining input sources for a first subset of a plurality of elastic constants for a stiffness matrix based upon the determined deviation of the wellbore, where each of the determined input sources provides sonic measurement data for use in determining at least one elastic constant among the plurality of elastic constants, determining an availability of non-sonic measurement data associated with the anisotropic formation, selecting at least one computer-implemented model among a plurality of computer-implemented models based at least in part upon the determined availability of non-sonic measurement data, applying the selected at least one computer-implemented model to determine a second subset of the plurality of elastic constants for the stiffness matrix, and estimating an anisotropic stress or an anisotropic mechanical property for the anisotropic formation using the determined plurality of elastic constants for the stiffness matrix.

Some embodiments also include evaluating completion quality using the estimated anisotropic stress or anisotropic mechanical property, while some embodiments include determining a perforation, stage and/or completion placement for a hydraulic fracturing operation using the estimated anisotropic stress or anisotropic mechanical property. Some embodiments include performing the hydraulic fracturing operation based upon the determined perforation, stage and/or completion placement, while some embodiments include determining a placement and/or trajectory of the wellbore using the estimated anisotropic stress or anisotropic mechanical property and prior to drilling of the wellbore. Some embodiments also include drilling the wellbore based upon the determined placement and/or trajectory of the wellbore.

Some embodiments further include, after applying the selected at least one model, and prior to estimating the anisotropic stress or anisotropic mechanical property, performing a dynamic to static conversion on the plurality of elastic constants. In addition, in some embodiments, the anisotropic formation is a transverse isotropic (TI) formation. In some embodiments, estimating the anisotropic stress or anisotropic mechanical property for the anisotropic formation using the determined plurality of elastic constants for the stiffness matrix comprises applying a computer-implemented stress model using the determined plurality of elastic constants. In some embodiments, selecting at least one computer-implemented model among a plurality of computer-implemented models based at least in part upon the determined availability of non-sonic measurement data includes selecting a computer-implemented model from among the plurality of computer-implemented models based upon availability of core data for the wellbore.

In some embodiments, selecting at least one computer-implemented model among a plurality of computer-implemented models based at least in part upon the determined availability of non-sonic measurement data includes selecting a computer-implemented model from among the plurality of computer-implemented models based upon availability of rock type classification data for the wellbore. In some embodiments, selecting at least one computer-implemented model among a plurality of computer-implemented models based at least in part upon the determined availability of non-sonic measurement data includes selecting a computer-implemented model from among the plurality of computer-implemented models based upon measurement quality.

In addition, in some embodiments, determining the deviation, determining the input sources, determining the availability, selecting the at least one computer-implemented model, and applying the selected at least one computer-implemented model are performed within a workflow of a petro-technical program, while in some embodiments, determining the deviation and determining the availability are performed in response to user input, and in some embodiments, selecting the at least one computer-implemented model includes making a user-overridable recommendation of the at least one computer-implemented model. In addition, some embodiments also include determining an axis of symmetry of the anisotropic formation, where determining the deviation of the wellbore includes determining a relative dip between the wellbore and the axis of symmetry of the anisotropic formation.

Some embodiments may also include an apparatus including at least one processing unit and program code configured upon execution by the at least one processing unit to estimate properties of an anisotropic formation in any of the manners discussed herein. Some embodiments may also include a program product including a computer readable medium and program code stored on the computer readable medium and configured upon execution by at least one processing unit to estimate properties of an anisotropic formation in any of the manners discussed herein.

Other variations and modifications will be apparent to one of ordinary skill in the art.

Hardware and Software Environment

Turning now to the drawings, wherein like numbers denote like parts throughout the several views, FIG. 1 illustrates an example data processing system 10 in which the various technologies and techniques described herein may be implemented. System 10 is illustrated as including one or more computers 12, e.g., client computers, each including a central processing unit (CPU) 14 including at least one hardware-based processor or processing core 16. CPU 14 is coupled to a memory 18, which may represent the random access memory (RAM) devices comprising the main storage of a computer 12, as well as any supplemental levels of memory, e.g., cache memories, non-volatile or backup memories (e.g., programmable or flash memories), read-only memories, etc. In addition, memory 18 may be considered to include memory storage physically located elsewhere in a computer 12, e.g., any cache memory in a microprocessor or processing core, as well as any storage capacity used as a virtual memory, e.g., as stored on a mass storage device 20 or on another computer coupled to a computer 12.

Each computer 12 also generally receives a number of inputs and outputs for communicating information externally. For interface with a user or operator, a computer 12 generally includes a user interface 22 incorporating one or more user input/output devices, e.g., a keyboard, a pointing device, a display, a printer, etc. Otherwise, user input may be received, e.g., over a network interface 24 coupled to a network 26, from one or more external computers, e.g., one or more servers 28 or other computers 12. A computer 12 also may be in communication with one or more mass storage devices 20, which may be, for example, internal hard disk storage devices, external hard disk storage devices, storage area network devices, etc.

A computer 12 generally operates under the control of an operating system 30 and executes or otherwise relies upon various computer software applications, components, programs, objects, modules, data structures, etc. For example, a petro-technical module or component 32 executing within a wellbore platform 34 may be used to access, process, generate, modify or otherwise utilize petro-technical data, e.g., as stored locally in a database 36 and/or accessible remotely from a collaboration platform 38. Collaboration platform 38 may be implemented using multiple servers 28 in some implementations, and it will be appreciated that each server 28 may incorporate a CPU, memory, and other hardware components similar to a computer 12.

In one non-limiting embodiment, for example, petro-technical module 32 may be implemented as an anisotropic property workflow module, wellbore platform 34 may implemented as the Techlog software platform, while collaboration platform 38 may be implemented as the STUDIO E&P KNOWLEDGE ENVIRONMENT platform, all of which are available from Schlumberger Ltd. and its affiliates. It will be appreciated, however, that the techniques discussed herein may be utilized in connection with other platforms and environments, so the invention is not limited to the particular software platforms and environments discussed herein.

In general, the routines executed to implement the embodiments disclosed herein, whether implemented as part of an operating system or a specific application, component, program, object, module or sequence of instructions, or even a subset thereof, will be referred to herein as "computer program code," or simply "program code." Program code generally comprises one or more instructions that are resident at various times in various memory and storage devices in a computer, and that, when read and executed by one or more hardware-based processing units in a computer (e.g., microprocessors, processing cores, or other hardware-based circuit logic), cause that computer to perform the steps embodying desired functionality. Moreover, while embodiments have and hereinafter will be described in the context of fully functioning computers and computer systems, those skilled in the art will appreciate that the various embodiments are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, DVD, or other optical storage, magnetic cassettes, magnetic tape, magnetic disk storage or other magnetic storage devices, or any other medium that can be used to store the desired information and which can be accessed by computer 10. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Furthermore, it will be appreciated by those of ordinary skill in the art having the benefit of the instant disclosure that the various operations described herein that may be performed by any program code, or performed in any routines, workflows, or the like, may be combined, split, reordered, omitted, and/or supplemented with other techniques known in the art, and therefore, the invention is not limited to the particular sequences of operations described herein.

Those skilled in the art will recognize that the example environment illustrated in FIG. 1 is not intended to limit the invention. Indeed, those skilled in the art will recognize that other alternative hardware and/or software environments may be used without departing from the scope of the invention.

Oilfield Operations

FIGS. 2A-2D illustrate simplified, schematic views of an oilfield 100 having subterranean formation 102 containing reservoir 104 therein in accordance with implementations of various technologies and techniques described herein. FIG. 2A illustrates a survey operation being performed by a survey tool, such as seismic truck 106.1, to measure properties of the subterranean formation. The survey operation is a seismic survey operation for producing sound vibrations. In FIG. 2A, one such sound vibration, sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 2B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud may be filtered and returned to the mud pit. A circulating system may be used for storing, controlling, or filtering the flowing drilling muds. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produces data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Generally, the wellbore is drilled according to a drilling plan that is established prior to drilling. The drilling plan sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 2C illustrates a wireline operation being performed by wireline tool 106.3 suspended by rig 128 and into wellbore 136 of FIG. 2B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 2A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 2D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 2B-2D illustrate tools used to measure properties of an oilfield, it will be appreciated that the tools may be used in connection with non-oilfield operations, such as gas fields, mines, aquifers, storage, or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 2A-2D are intended to provide a brief description of an example of a field usable with oilfield application frameworks. Part, or all, of oilfield 100 may be on land, water, and/or sea. Also, while a single field measured at a single location is depicted, oilfield applications may be utilized with any combination of one or more oilfields, one or more processing facilities and one or more wellsites.

Figure 3:
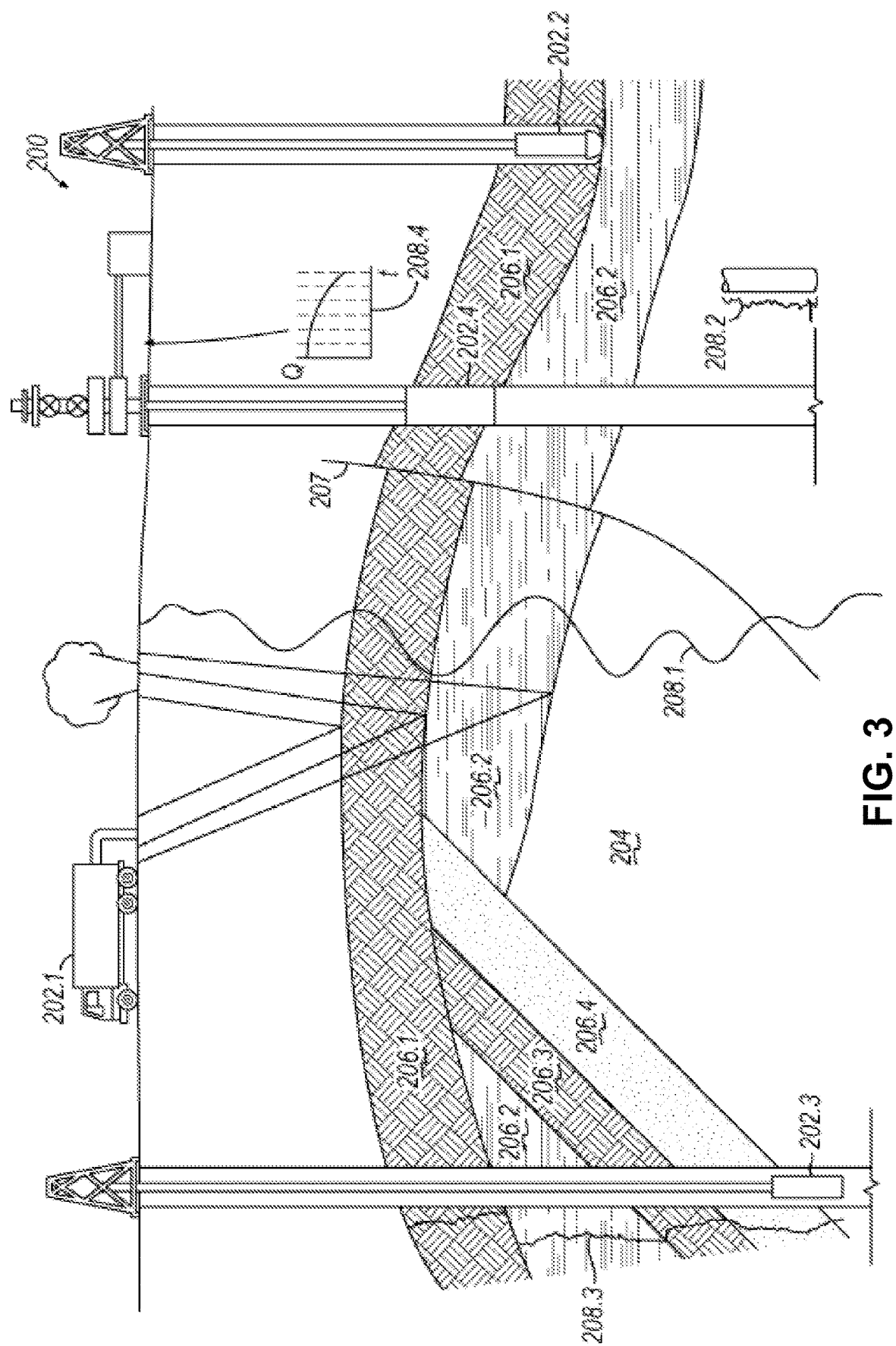
FIG. 3 illustrates a schematic view, partially in cross section of an oilfield having a plurality of data acquisition tools positioned at various locations along the oilfield for collecting data from the subterranean formations in accordance with implementations of various technologies and techniques described herein.

FIG. 3 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 2A-2D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively, however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that generally provides a resistivity or other measurement of the formation at various depths.

A production decline curve or graph 208.4 is a dynamic data plot of the fluid flow rate over time. The production decline curve generally provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, generally below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 3, may then be processed and/or evaluated. Generally, seismic data displayed in static data plot 208.1 from data acquisition tool 202.1 is used by a geophysicist to determine characteristics of the subterranean formations and features. The core data shown in static plot 208.2 and/or log data from well log 208.3 are generally used by a geologist to determine various characteristics of the subterranean formation. The production data from graph 208.4 is generally used by the reservoir engineer to determine fluid flow reservoir characteristics. The data analyzed by the geologist, geophysicist and the reservoir engineer may be analyzed using modeling techniques.

Figure 4:
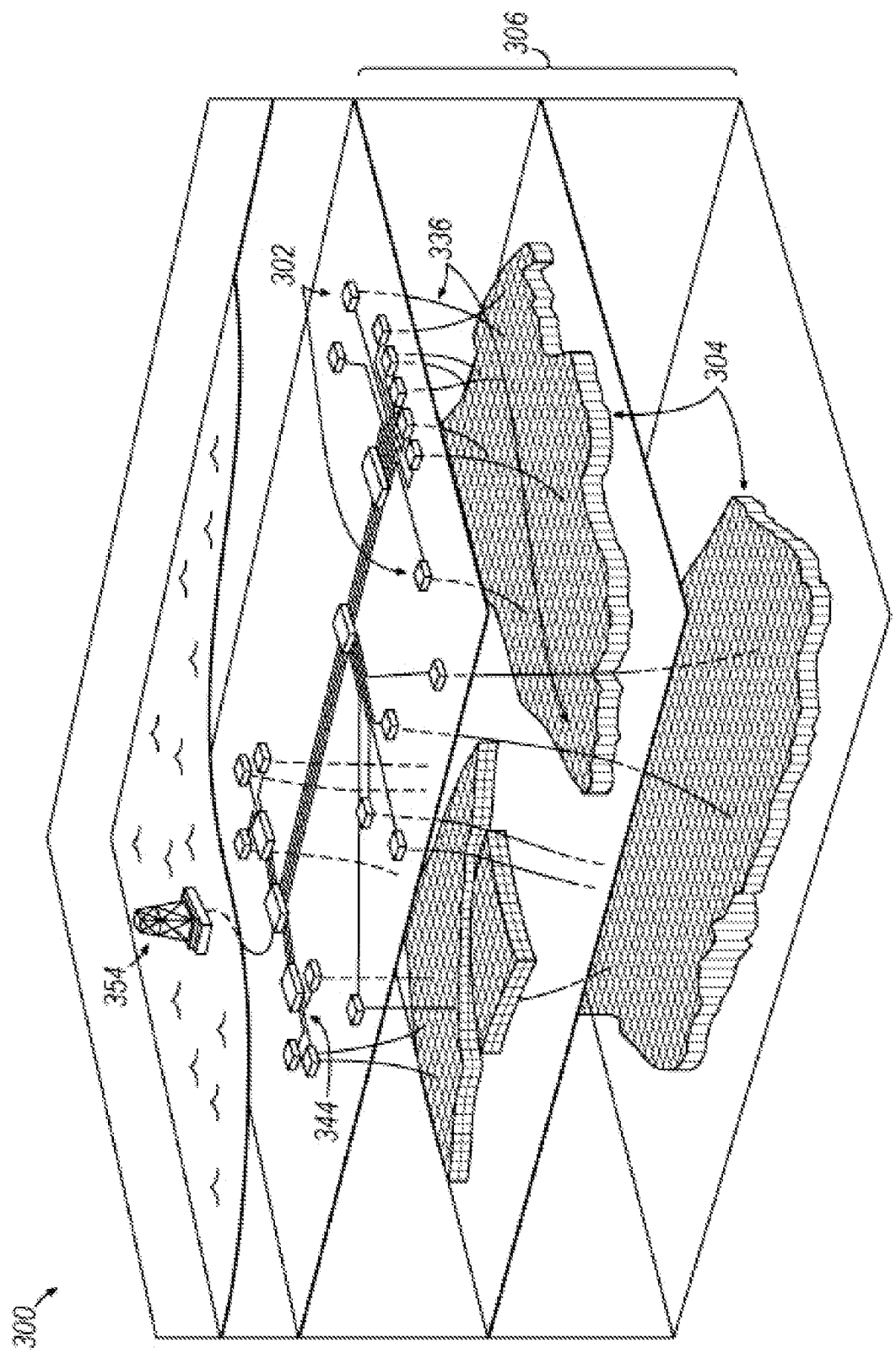
FIG. 4 illustrates a production system for performing one or more oilfield operations in accordance with implementations of various technologies and techniques described herein.

FIG. 4 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 4 is not intended to limit the scope of the oilfield application system. Part or all of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Workflow for Determining Stresses and/or Mechanical Properties in Anisotropic Formations Embodiments consistent with the invention may be utilized, for example, to provide a guided workflow for assisting a user in selecting an appropriate method for estimating anisotropic stresses and/or anisotropic mechanical properties (collectively referred to as anisotropic properties) in an anisotropic formation such as a TI formation. Various types of anisotropic mechanical properties are discussed, for example, in PCT Pub. No. WO 2013/112466, which is incorporated by reference herein. A workflow consistent with the invention may be implemented, for example, within a petro-technical application such as the Techlog platform available from Schlumberger Ltd. and its affiliates, e.g., as a anisotropic property workflow module thereof. It will be appreciated, however, that the herein-described techniques may be utilized in other petro-technical applications and environments, so the invention is not limited to this particular implementation.

Anisotropic stresses and/or anisotropic mechanical properties and other types of geomechanical data are used in a number of different oil & gas operations, e.g., wellbore placement and/or trajectory, wellbore stability testing, wellbore drilling, hydraulic fracture simulation, determining hydraulic fracturing perforation, stage and/or completion placement, etc. Such anisotropic properties may also be useful in evaluating hydraulic fracture effectiveness and/or completion quality (e.g., rock susceptibility to fracturing, fracture vertical containment, fracture conductivity, interference of complex natural fracture network, rock-fluid interaction, etc.).

Anisotropic properties are used in the presence of subsurface formations exhibiting anisotropicity, particularly subsurface formations including shales. Shales are often described as being transversely isotropic with a vertical axis of rotational symmetry (referred to as TIV). In TIV formations, the elastic stiffness matrix may be reduced to 5 unknowns: C11, C33, C44, C66 and C13:

$$C_{ij} = \begin{pmatrix} C_{11} & C_{12} & C_{13} & 0 & 0 & 0 \\ C_{12} & C_{11} & C_{13} & 0 & 0 & 0 \\ C_{13} & C_{13} & C_{33} & 0 & 0 & 0 \\ 0 & 0 & 0 & C_{44} & 0 & 0 \\ 0 & 0 & 0 & 0 & C_{44} & 0 \\ 0 & 0 & 0 & 0 & 0 & C_{66} \end{pmatrix} \quad \text{Eq. (1)}$$

where C12=C11−2*066.

Out of these unknowns, elastic constants C33, C44 and C66 may be obtained from sonic measurement data in a vertical well, leaving the total number of unknowns to two, namely C11 and C13. In horizontal wells, however, elastic constants C11, C44 and C66 may be obtained directly from monopole and cross-dipole sonic measurement data, whereby the unknowns are C13 and C33. Table I, for example, illustrates the input sources and unknowns for vertical and horizontal wells:

TABLE I

Input Sources and Unknowns for Vertical/Horizontal Wells

| Elastic Constant | Vertical Well | Horizontal Well |
|---|---|---|
| C11 | Unknown | Measured from compressional (sonic delta time (DT) measured parallel to bedding) |
| C13 | Unknown | Unknown |
| C33 | Measured from compressional (sonic delta time (DT) measured perpendicular to bedding) | Unknown |
| C44 | Measured from dipole shear (from either fast or slow as in TIV media C44 = C55) | Measured from slow dipole shear |
| C66 | Measured from Stoneley Shear | Measured from fast dipole shear |

In addition, in some embodiments, geophysical properties and geomechanical properties may be determined based upon the following relationships:

TABLE II

Relations Between Elastic Stiffnesses and Geophysical/Geomechanical Properties

Relation between Thomsen Parameters and Elastic Stiffnesses

| | |
|---|---|
| $V_{PO} = \sqrt{C_{33}/\rho}$ | Vertical P-wave velocity |
| $V_{SO} = \sqrt{C_{44}/\rho}$ | Vertical S-wave velocity |
| $\varepsilon = (C_{11} - C_{33})/(2C_{33})$ | P-wave anisotropy |
| $\gamma = (C_{66} - C_{44})/(2C_{44})$ | S-wave anisotropy |
| $\delta = [(C_{13} + C_{44})^2 - (C_{33} - C_{44})^2]/[2C_{33}(C_{33} - C_{44})]$ | Small-offset NMO factor |

Relation between Geomechanical Parameters and Elastic stiffnesses

| | |
|---|---|
| $E_v = C_{33} - 2C_{13}^2/(C_{11} + C_{12})$ | Vertical Young's modulus |
| $E_h = [(C_{11} - C_{12})(C_{11}C_{33} - 2C_{13}^2 + C_{12}C_{33})]/(C_{11}C_{33} - C_{13}^2)$ | Horizontal Young's modulus |
| $\mu_v = C_{44}$ | Vertical plane shear modulus |

TABLE II-continued

Relations Between Elastic Stiffnesses and
Geophysical/Geomechanical Properties

| | |
|---|---|
| $\mu_h = C_{66}$ | Horizontal plane shear modulus |
| $v_v = C_{13}/(C_{11} + C_{12})$ | Vertical Poisson's ratio |

In order to calculate the aforementioned unknowns in Table I above, more data may need to be recorded in the same region, but with a different angle compared with the axis of symmetry. Alternatively, a computer-implemented model may be used to estimate the unknowns. One of the most basic and widely used models for shales is the ANNIE model (Schoenberg, M., Muir, F., and Sayers, C., 1995, *Introducing ANNIE: A simple three-parameter anisotropic velocity model for shales*, Journal of Seismic Exploration, 5, 35-49, which is incorporated by reference herein). However, a number of other computer-implemented models exist that may be better adapted to a particular formation based at least in part on the availability of additional measurement data, e.g., the results of core analysis, etc. It has been found, for example, that the choice of an appropriate computer-implemented model may depends on the log data that is available, as well as the lack or presence for fit-for-purpose core analysis data. For example, U.S. Pat. No. 8,175,807 to Suarez-Rivera (the "Suarez-Rivera patent"), which is assigned to the same assignee as the present application, and which is incorporated by reference herein, discusses a number of different alternative models that may be useful in different applications and/or circumstances.

Given the variability that may exist as a result of the trajectory of a wellbore relative to a bedding as well as the variability that may exist in terms of selecting an appropriate model from among the various models that may be used in connection with estimating anisotropic properties, it has been found that it may be challenging so select the appropriate operations, simulations and/or calculations to determine the unknown elastic constants suitable for estimating anisotropic properties such as anisotropic stresses and anisotropic mechanical properties.

Embodiments consistent with the invention address this challenge by providing an integrated workflow with a user-friendly interface to assist a user in calculating unknown elastic constants based at least in part on one or more of the data available, wellbore geometry, calibrated static mechanical properties, etc. As will become more apparent below, in some embodiments an interface may also be provided that allows for comparisons between different models and simplifies the process of outputting final deliverables used for various applications such as hydraulic fracturing, completion design, drilling parameters, etc.

In particular, in some embodiments of the invention, anisotropic properties of an anisotropic formation may be estimated based in part on determinations of (1) a deviation of a wellbore associated with the anisotropic formation and (2) an availability of non-sonic measurement data associated with the anisotropic formation, which may be used in the selection of at least one computer-implemented model that in turn may be applied to determine one or more unknown elastic constants for an elastic stiffness matrix. With the unknown elastic constants determined, an anisotropic stress and/or an anisotropic mechanical property may then be estimated for the anisotropic formation using the aforementioned elastic stiffness matrix, with the anisotropic stress and/or anisotropic mechanical property used for various oil & gas operations associated with the anisotropic formation.

The availability of various non-sonic measurement data may be used in the aforementioned determination in different embodiments. For example, availability may be based upon the presence or absence of core data, or may be based on the presence or absence of core data in particular depths along a wellbore. Availability may also be based on the presence or absence of data classifying rock types within a formation, e.g., what types of rocks are present in the formation, and in some embodiments, at what depths those different rock types are found.

The availability determination may also present an opportunity to apply combinations of models within the same analysis, e.g., to apply different models to different depths along a wellbore based upon the availability of data such as core data and/or rock type classification data, e.g., so that one particular model may be used at a particular depth or range of depths based upon the presence of relevant core data while another particular model may be used at another particular depth or range of depths based upon the absence of relevant core data. As another example, where a wellbore traverses anisotropic and isotropic regions of a formation based upon rock type classification data, different anisotropic and isotropic models may be used for performing analysis in those respective regions. Other variations will be apparent to one of ordinary skill in the art having the benefit of the instant disclosure.

It will also be appreciated that in some embodiments, anisotropic properties may be used in different manners for different oil & gas operations and/or by different tools. In some embodiments, for example, anisotropic stresses may be determined directly from the elastic constants determined for an elastic stiffness matrix. In other embodiments, anisotropic mechanical properties may be determined from the elastic constants determined for an elastic stiffness matrix, and anisotropic stresses may then be determined from the anisotropic mechanical properties, as will be appreciated by one of ordinary skill in the art having the benefit of the instant disclosure.

Figure 5:
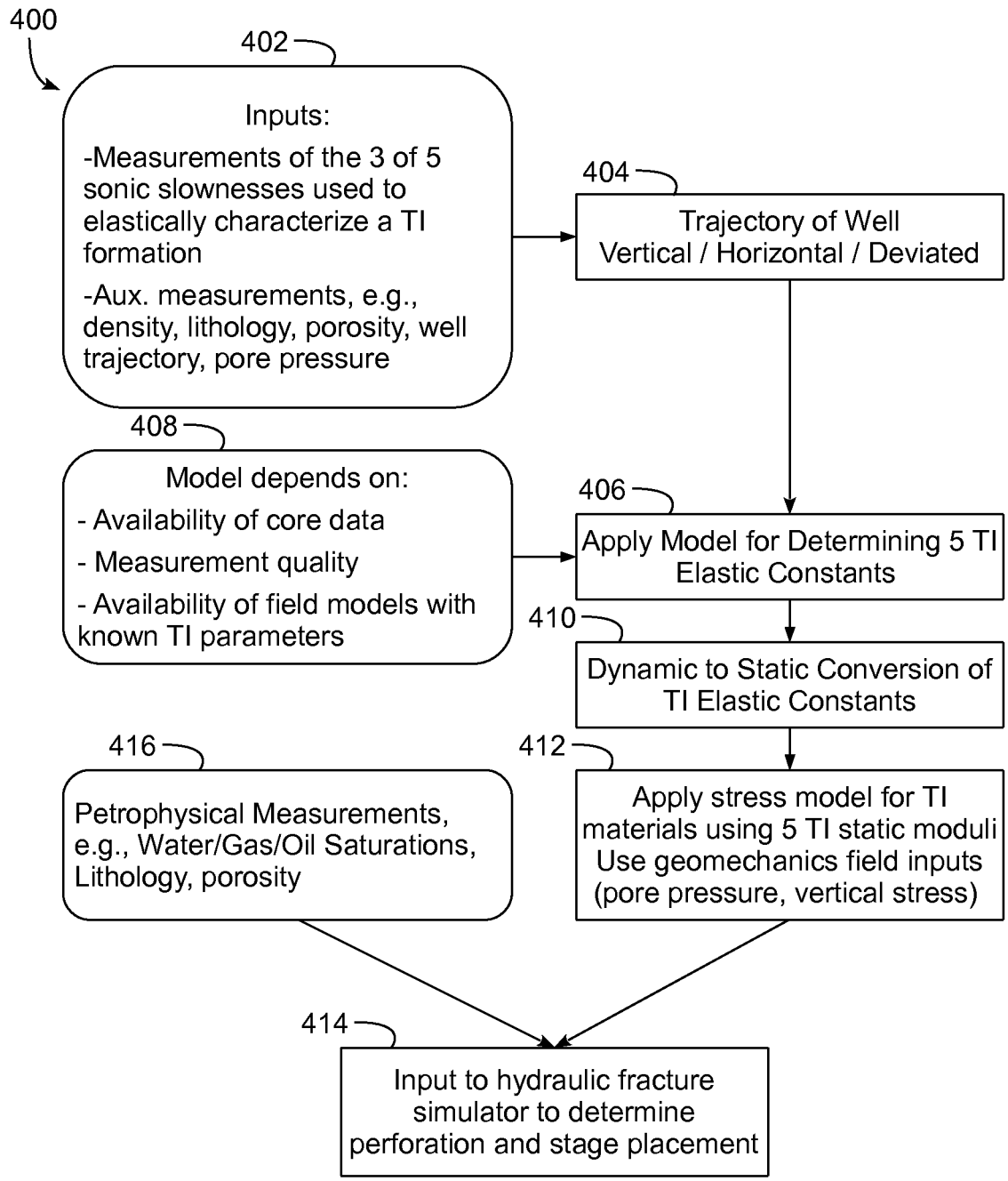
FIG. 5 is a block diagram of an example wellbore perforation and stage placement workflow in accordance with implementations of various technologies and techniques described herein.

Now turning to FIG. 5, this figure illustrates an example wellbore perforation and stage placement workflow 400 suitable for use with a transversely isotropic (TI) formation consistent with some embodiments of the invention. As shown in block 402, workflow 400 may receive as inputs measurements of the three of five sonic slownesses used to elastically characterize the TI formation, e.g., in based upon sonic measurement data (e.g., sonic well logs) collected via surveys performed by one or more sonic measurement tools placed in a wellbore. Workflow 400 may also receive as inputs additional measurements (referred to herein as auxiliary measurements), representing petrophysical data, at least a portion of which is non-sonic data. The additional measurements may include, for example, one or more of density, lithology, porosity, well trajectory, pore pressure, etc. Collection of such data would be well within the abilities of one of ordinary skill in the art having the benefit of the instant disclosure.

Workflow 400 begins in block 404 by determining the trajectory or deviation of the well, or in the least the trajectory of a portion of a wellbore for which anisotropic properties are being estimated. The deviation may be characterized as horizontal or vertical, or may also be characterized as 'deviated' in some embodiments for portions of a wellbore that are angled with respect to both horizontal and vertical. The wellbore deviation is generally considered relative to an axis of symmetry for the relevant portion of the subsurface formation, rather than a true horizontal or vertical direction relative to the surface of the Earth. In other embodiments, the deviation may be classified in other manners, or may be represented by a numerical value. As such, a determination of wellbore deviation may be based upon a determined axis of symmetry of the anisotropic formation, such that determining the deviation of the wellbore is based on a determination of a relative dip between the wellbore and the axis of symmetry of the anisotropic formation.

In some embodiments of the invention, the deviation may be determined by soliciting user input. In other embodiments, however, the deviation may be determined automatically, e.g., through analysis of the wellbore trajectory relative to a known axis of symmetry for the relevant portion of the subsurface formation.

Next, in block 406, one or more computer-implemented models are applied for determining the five elastic constants for the TI formation. The one or more models that are applied are selected based upon a number of factors, e.g., the factors listed in block 408. For example, the selection of a model may be based upon the availability of core data, e.g., data collected from core samples takes at different locations and/or vectors along a wellbore. For example, selection of some models, e.g., a modification of the ANNIE model that relies on calibration from core data disclosed in the aforementioned Suarez-Rivera patent (also referred to as a MANNIE CORE model) generally would not be appropriate in the absence of such core data.

Selection of a model may also be based upon measurement quality. For example, it may not be desirable to select some models, e.g., the MANNIE Core model when the quality of the core analysis measurements is not great. Selection of a model may also be based upon the availability of additional field models with known TI parameters.

In addition, as noted above, selection of a model is based in part on the determined trajectory or deviation of the wellbore, as the input sources for the known elastic constants, and the unknowns to be estimated to complete the five elastic constants of an elastic stiffness matrix, differ depending upon whether a wellbore or relevant portion thereof is horizontal or vertical.

As will become more apparent below, selection of a model or multiple models may be performed in an automated fashion based upon an analysis of available data, well trajectory, availability of field models and/or measurement quality, and may result in an automated application of the selected models to determine the desired unknowns. In some embodiments, applying the selected models may be performed independent of any user input, while in other embodiments, the selection of one or more models may be made as recommendations to a user, with the user given the option of overriding the recommendations by selecting one or more additional models and/or unselecting one or more recommended models.

In addition, when models are selected and applied, input parameters for those models may be selected or determined in an automated fashion, with the selection or determination being performed independent of any user input in some embodiments, or alternatively presented as recommendations that a user may elect to override in other embodiments. The input parameters may be considered in some embodiments to be default parameters, and may be fixed in some embodiments, or may be retrieved from a database and/or calculated in an automated fashion in other embodiments.

Block 406 therefore applies one or more computer-implemented models to determine the five elastic constants of an elastic stiffness matrix for the TI formation. Block 410 then performs a dynamic to static conversion of the TI elastic constants, e.g., as may be needed for simulating hydraulic fracturing operations, resulting in the generation of five TI static moduli. In some embodiments, multiple techniques for performing the dynamic to static conversions may be used, and as such, block 410 may select from among multiple techniques and either automatically apply the selected techniques or recommend one or more of such techniques to a user to provide the user with the option to override any selections prior to performing the conversion. In some embodiments, default parameters for such techniques may be determined or calculated, e.g., by accessing a database, and a user may be provided with the option of overriding any default parameters. It will be appreciated that performing a dynamic to static conversion of elastic constants would be well within the abilities of one of ordinary skill in the art having the benefit of the instant disclosure.

Next, block 412 applies a stress model for TI materials using the five TI static moduli determined in block 410 to generate anisotropic stresses and/or anisotropic mechanical properties from the five TI static moduli. Application of the stress model may use various geomechanics field inputs such as pore pressure, vertical stress, etc. An example application of a stress model is found, for example, in Thiercelin, M. and Plumb, R., 1994: *Core-based prediction of lithologic stress contrasts in east Texas formations*, SPE Formation Evaluation, 9, 4, 251-258, paper SPE 21847-PA, which is incorporated by reference herein.

In some embodiments, multiple techniques for applying the stress model may be used, and as such, block 412 may select from among multiple techniques and/or stress models and either automatically apply the selected techniques and/or models or recommend one or more of such techniques and/or models to a user to provide the user with the option to override any selections prior to applying the stress model. In some embodiments, default parameters for such techniques and/or models may be determined or calculated, e.g., by accessing a database, and a user may be provided with the option of overriding any default parameters. It will be appreciated that applying a stress model to estimate anisotropic stresses and/or anisotropic mechanical properties would be well within the abilities of one of ordinary skill in the art having the benefit of the instant disclosure.

Upon completion of block 412, the resulting anisotropic stresses and/or mechanical properties may be provided as inputs to various oil & gas operations and/or tools, e.g., a hydraulic fracture simulator for the purpose of determining one or more perforation and/or stage zones along the wellbore, as illustrated in block 414. Moreover, as illustrated in block 416, additional petrophysical measurements, e.g., water/gas/oil saturations, lithology, porosity, etc. may also be used in such operations. It will be appreciated that for other operations and/or tools, other additional data may be used. It will also be appreciated that the various operations using anisotropic stresses and/or mechanical properties will be apparent to one of ordinary skill in the art having the benefit of the instant disclosure.

Figure 6:
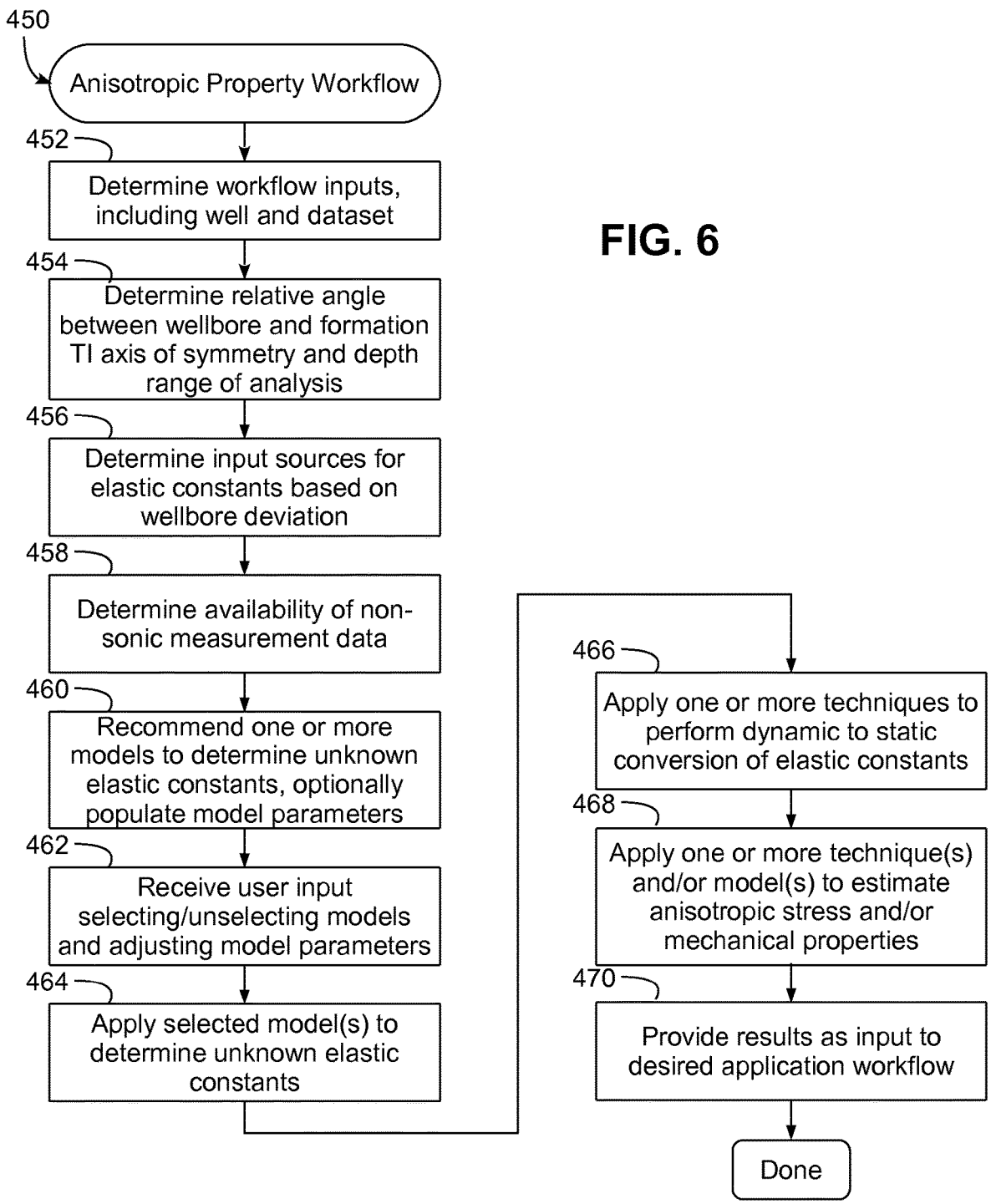
FIG. 6 is a flowchart illustrating an example sequence of operations for performing an anisotropic property workflow in accordance with implementations of various technologies and techniques described herein.

Now turning to FIG. 6, and with additional reference to the representative display presentations illustrated in FIGS. 7-8, FIG. 6 illustrates an example sequence of operations for an example anisotropic property workflow 450 consistent with the invention, and capable of being implemented in a petro-technical application. Workflow 450 begins in block 452 by determining one or more inputs to the workflow, including, for example, a well and a dataset of data relevant to the well. The inputs may be determined, for example, by querying a user, and the dataset after the well in some embodiments so that multiple datasets associated with a selected well may be displayed to a user for selection thereby. A selected dataset generally includes at a minimum sonic measurement data collected during one or more surveys of the wellbore using one or more sonic measurement tools, although additional data, including any of the aforementioned auxiliary measurements and other data discussed above may also be incorporated into a dataset consistent with the invention.

Next, in block 454 a relative angle between the wellbore and the formation TI axis of symmetry may be determined along with a depth range of analysis. For example, as illustrated by display 480 of FIG. 7 (which represents a step in the example workflow), a user may be presented with text boxes 482, 484 to input top and bottom depths for the depth range, a checkbox 486 to select whether computation of the elastic constants or moduli will be performed, and a drop down control 488 to select between a vertical and horizontal wellbore deviation for the selected depth range. Display 480 may also include additional informational material for a user, including a table of elastic constants for vertical and horizontal wells (similar to Table I above). Of note, checkbox 486 may be unchecked by a user whenever the elastic constants have already been computed (e.g., during a prior run of the workflow). In addition, the table displayed in display 480 denotes "unknown" elastic constants as "modeled" to indicate that one or more models may be used in the workflow to determine these constants. Display 480 also displays buttons 490, 492 and 494 to provide a user with the ability to go back (button 490) or go forward (button 492) in the workflow, or to cancel the workflow (button 494). As an example, button 492 may be used to trigger a transition from block 454 to block 456 in FIG. 6 after the user has input a wellbore deviation and/or depth range. It will be appreciated by one of ordinary skill in the art having the benefit of the instant disclosure than an innumerable number of different types and/or configurations of user controls may be used to interact with a user in display 480 as well as the other displays discussed hereinafter. As such, the invention is not limited to the particular user interfaces disclosed herein. It will also be appreciated that wellbore deviation and depth range may be determined automatically, and independent of user input, in some embodiments.

Returning to FIG. 6, once the wellbore deviation and depth range are determined in block 454, block 456 determines the input sources for the elastic constants based on the wellbore deviation, e.g., based upon Table I or any other suitable mapping that associates input sources (i.e., sources of sonic measurement data from which elastic constants may be determined) with elastic constants based upon the deviation of a wellbore relative to a TI axis of symmetry. Block 456 may also in some embodiments determine the elastic constants themselves from the input sources. In other embodiments, however, the actual determination of those elastic constants may be deferred, e.g., until unknown elastic constants are estimated using one or more selected models.

Block 458 next determines the availability of non-sonic measurement data, e.g., any of the non-sonic measurement data discussed above such as core data, rock type classification data, measurement quality, etc. The determination may be performed, for example, by reviewing the dataset input to the workflow, or by otherwise searching for various types of relevant data in a database.

Next, block 460 recommends one or more models to determine the unknown elastic constants. In addition, in some embodiments, block 460 may also determine one or more model parameters to initially recommend to a user. Then, in block 462, user input is received selecting/unselecting available models and/or adjusting recommended model parameters. In some embodiments, no such user input may be received, and in some embodiments, no solicitation of such user input may be made.

As an example of one manner of implementing blocks 460 and 462, FIG. 8 illustrates a display 500 representing another step in the workflow. In this display, information regarding each of a plurality of available models is presented at 502, 504 and 506, with information regarding additional models not shown in the display, but available by scrolling down further through the display. For each model, a checkbox 508 is presented, along with one or more user controls 510 (e.g., text boxes) for receiving model parameters relevant to that model. Additional information discussing the model and/or the model parameters may be provided, as shown in FIG. 8.

In the illustrated embodiment, block 460 of FIG. 6 recommends models by pre-selecting the checkbox 508 associated with any recommended model. In addition, block 460 pre-enters any recommended model parameters in the relevant user controls 510 for a model. As such, a user is able to optionally check or uncheck any checkboxes 508 and optionally modify any model parameters specified in a user control 510 prior to selecting next button 492 to proceed to the next step in the workflow.

In the illustrated embodiment, a number of different models may be presented to a user and recommended by the workflow. First, as illustrated by information 502, one model that may be presented is an ANNIE model, discussed in the aforementioned Schoenberg paper. The ANNIE model may be selected as a default, for example, when none of the conditions particular to any of the other models are met.

Second, as illustrated by information 504, another model that may be presented is a MANNIE CORE model, which is a modified ANNIE model calibrated using core data, and discussed in the aforementioned Suarez-Rivera patent. This model may be selected, for example, in response to determining that core data is available for the wellbore, or in response to determining that core data in the specified depth range is available. As shown in FIG. 8, this model may include multiplier model parameters mult13 and mult33 for the equation provided in information 504.

Third, as illustrated by information 506, another model that may be presented is a MANNIE SONIC model, which is another modified ANNIE model that determines multipliers mult13 and mult33 as a function of the Thomsen parameter Gamma, and also discussed in the aforementioned Suarez-Rivera patent. This model may be selected, for example, when core data with adequate measurements is not available. As shown in FIG. 8, this model may include model parameters for A13, A33, B13, B33, S13 and S33 for the equation provided in information 506.

Additional models, not shown in the portion of display 500 illustrated in FIG. 8, may also be selected. For example, another model that may be presented is a MANNIE VCL model, which is a modified ANNIE model that is based upon the availability of Volume of Clay (VCL) data.

As another example, an Isotropic model may also be selected. An Isotropic model can be used when the formation is exhibiting an isotropic behavior. This model may include model parameters such as Young's modulus and Poisson Ratio.

Other models may be made available for selection in other embodiments, as will be appreciated by one of ordinary skill in the art having the benefit of the instant disclosure.

It will be appreciated that in some embodiments, the models relevant to different well deviations may be collectively displayed in display 500 in some embodiments. In other embodiments, the models displayed in display 500 may be limited to those relevant for a selected well deviation.

Returning to FIG. 6, after a user has selected next button 492 in FIG. 8, block 462 passes control to block 464 to apply the selected model(s) to determine the unknown elastic constants. Applying such models to estimate the unknown elastic constants is performed in the specific manners applicable to the selected models, as will be appreciated by one of ordinary skill in the art having the benefit of the instant disclosure.

Block 466 next optionally applies one or more techniques to perform dynamic to static conversion of the elastic constants. In some embodiments, no dynamic to static conversion may be performed, while in other embodiments, only one technique may be supported. In some embodiments, the determination and application of such techniques may be made in an automated fashion appropriate for the particular input data and user selections, while in other embodiments, multiple techniques may be available and presented to a user as recommendations. In addition, any parameters relevant to any selected techniques may also be recommended to a user as default parameters, e.g., in a similar manner to the models used to estimate unknown elastic constants.

A wide variety of different dynamic to static conversion techniques may be used, as will be appreciated by one of ordinary skill in the art having the benefit of the instant disclosure. For example, the available techniques may include a generic power law that is calibrated to the core measurements, e.g., $E_{STA}=A*E_{DYN}{}^{B}$, a linear law, e.g., $\log(E_{STA})=A+B*\log(E_{DYN})$, a Plumb Bradford correlation, a Fuller correlation, or an empirical relation that was established for one or more particular rock types.

After the dynamic to static conversion is performed in block 466, block 468 applies one or more techniques and/or models to estimate the desired anisotropic stresses and/or anisotropic mechanical properties. In some embodiments, the determination and application of such techniques and/or models may be made in an automated fashion appropriate for the particular input data and user selections, while in other embodiments, multiple techniques and/or models may be available and presented to a user as recommendations. In addition, any parameters relevant to any selected techniques and/or models may also be recommended to a user as default parameters, e.g., in a similar manner to the models used to estimate unknown elastic constants.

A wide variety of different estimation techniques and/or models may be used to estimate anisotropic stresses and/or anisotropic mechanical properties, as will be appreciated by one of ordinary skill in the art having the benefit of the instant disclosure. For example, the available techniques may include methods to estimate the horizontal stresses based on the anisotropic elastic parameters as well as pore pressure, Biot coefficient, vertical stress, tectonic strains, etc. One manner of determining horizontal stresses in a VTI medium, for example, may rely on the following calculations:

$$\sigma_h - \alpha P_p = \frac{E_{horz}}{E_{vert}} \frac{v_{vert}}{1-v_{horz}}[\sigma_v - \alpha P_p] + \frac{E_{horz}}{1-v_{horz}^2}\varepsilon_h + \frac{E_{horz}v_{horz}}{1-v_{horz}^2}\varepsilon_H$$

$$\sigma_H - \alpha P_p = \frac{E_{horz}}{E_{vert}} \frac{v_{vert}}{1-v_{horz}}[\sigma_v - \alpha P_p] + \frac{E_{horz}}{1-v_{horz}^2}\varepsilon_H + \frac{E_{horz}v_{horz}}{1-v_{horz}^2}\varepsilon_h$$

where $\sigma_h$ is minimum horizontal stress, $\sigma_H$ is maximum horizontal stress, $P_p$ is pore pressure, $\alpha$ is the Biot coefficient, $\sigma_v$ is overburden stress, $\varepsilon_h$ is the minimum principal horizontal strain, $\varepsilon_H$ is the maximum principal horizontal strain, $E_{horz}$ is the horizontal Young's Modulus, $E_{vert}$ is the vertical Young's Modulus, $v_{horz}$ is the horizontal Poisson's Ratio, and $v_{vert}$ is the vertical Poisson's Ratio.

The resulting anisotropic stresses and/or anisotropic mechanical properties generated as a result of applying the techniques and/or models in block 468 may then be stored and/or provided as input to another workflow for a particular oil & gas application or operation, as shown in block 470. Workflow 450 is then complete.

While particular embodiments have been described, it is not intended that the invention be limited thereto, as it is intended that the invention be as broad in scope as the art will allow and that the specification be read likewise. It will therefore be appreciated by those skilled in the art that yet other modifications could be made without deviating from its spirit and scope as claimed.

What is claimed is:

1. A method of estimating properties of an anisotropic formation, the method comprising:
   determining a deviation of a wellbore associated with the anisotropic formation;
   determining input sources for a first subset of a plurality of elastic constants for a stiffness matrix based upon the determined deviation of the wellbore, each of the determined input sources providing sonic measurement data for use in determining at least one elastic constant among the plurality of elastic constants;
   determining an availability of non-sonic measurement data associated with the anisotropic formation;
   selecting at least one computer-implemented model among a plurality of computer-implemented models based at least in part upon the determined availability of non-sonic measurement data;
   applying the selected at least one computer-implemented model to determine a second subset of the plurality of elastic constants for the stiffness matrix; and
   estimating an anisotropic stress or an anisotropic mechanical property for the anisotropic formation using the determined plurality of elastic constants for the stiffness matrix.

2. The method of claim 1, further comprising evaluating completion quality using the estimated anisotropic stress or anisotropic mechanical property.

3. The method of claim 1, further comprising determining a perforation, stage and/or completion placement for a hydraulic fracturing operation using the estimated anisotropic stress or anisotropic mechanical property.

4. The method of claim 3, further comprising performing the hydraulic fracturing operation based upon the determined perforation, stage and/or completion placement.

5. The method of claim 1, further comprising determining a placement and/or trajectory of the wellbore using the estimated anisotropic stress or anisotropic mechanical property and prior to drilling of the wellbore.

6. The method of claim 5, further comprising drilling the wellbore based upon the determined placement and/or trajectory of the wellbore.

7. The method of claim 1, further comprising, after applying the selected at least one model, and prior to estimating the anisotropic stress or anisotropic mechanical property, performing a dynamic to static conversion on the plurality of elastic constants.

8. The method of claim 1, wherein the anisotropic formation is a transverse isotropic (TI) formation.

9. The method of claim 1, wherein estimating the anisotropic stress or anisotropic mechanical property for the anisotropic formation using the determined plurality of elastic constants for the stiffness matrix comprises applying a computer-implemented stress model using the determined plurality of elastic constants.

10. The method of claim 1, wherein selecting at least one computer-implemented model among a plurality of computer-implemented models based at least in part upon the determined availability of non-sonic measurement data includes selecting a computer-implemented model from among the plurality of computer-implemented models based upon availability of core data for the wellbore.

11. The method of claim 1, wherein selecting at least one computer-implemented model among a plurality of computer-implemented models based at least in part upon the determined availability of non-sonic measurement data includes selecting a computer-implemented model from among the plurality of computer-implemented models based upon availability of rock type classification data for the wellbore.

12. The method of claim 1, wherein selecting at least one computer-implemented model among a plurality of computer-implemented models based at least in part upon the determined availability of non-sonic measurement data includes selecting a computer-implemented model from among the plurality of computer-implemented models based upon measurement quality.

13. The method of claim 1, wherein determining the deviation, determining the input sources, determining the availability, selecting the at least one computer-implemented model, and applying the selected at least one computer-implemented model are performed within a workflow of a petro-technical program.

14. The method of claim 13, wherein determining the deviation and determining the availability are performed in response to user input.

15. The method of claim 13, wherein selecting the at least one computer-implemented model includes making a user-overridable recommendation of the at least one computer-implemented model.

16. The method of claim 1, further comprising determining an axis of symmetry of the anisotropic formation, wherein determining the deviation of the wellbore includes determining a relative dip between the wellbore and the axis of symmetry of the anisotropic formation.

17. An apparatus, comprising:
at least one processing unit; and
program code configured upon execution by the at least one processing unit to estimate properties of an anisotropic formation by:
  determining a deviation of a wellbore associated with the anisotropic formation;
  determining input sources for a first subset of a plurality of elastic constants for a stiffness matrix based upon the determined deviation of the wellbore, each of the determined input sources providing sonic measurement data for use in determining at least one elastic constant among the plurality of elastic constants;
  determining an availability of non-sonic measurement data associated with the anisotropic formation;
  selecting at least one computer-implemented model among a plurality of computer-implemented models based at least in part upon the determined availability of non-sonic measurement data;
  applying the selected at least one computer-implemented model to determine a second subset of the plurality of elastic constants for the stiffness matrix; and
  estimating an anisotropic stress or an anisotropic mechanical property for the anisotropic formation using the determined plurality of elastic constants for the stiffness matrix.

18. The apparatus of claim 17, wherein the program code is configured to select at least one computer-implemented model among a plurality of computer-implemented models based at least in part upon availability of core data for the wellbore.

19. The apparatus of claim 17, wherein the program code is configured to determine the deviation, determine the input sources, determine the availability, select the at least one computer-implemented model, and apply the selected at least one computer-implemented model in a workflow of a petro-technical program.

20. A program product, comprising:
a computer readable medium; and
program code stored on the computer readable medium and configured upon execution by at least one processing unit to estimate properties of an anisotropic formation by:
  determining a deviation of a wellbore associated with the anisotropic formation;
  determining input sources for a first subset of a plurality of elastic constants for a stiffness matrix based upon the determined deviation of the wellbore, each of the determined input sources providing sonic measurement data for use in determining at least one elastic constant among the plurality of elastic constants;
  determining an availability of non-sonic measurement data associated with the anisotropic formation;
  selecting at least one computer-implemented model among a plurality of computer-implemented models based at least in part upon the determined availability of non-sonic measurement data;
  applying the selected at least one computer-implemented model to determine a second subset of the plurality of elastic constants for the stiffness matrix; and
  estimating an anisotropic stress or an anisotropic mechanical property for the anisotropic formation using the determined plurality of elastic constants for the stiffness matrix.

* * * * *